J. BECKER.
PHOTOGRAPHIC CAMERA.
APPLICATION FILED JULY 10, 1905.

1,103,342.

Patented July 14, 1914.
7 SHEETS—SHEET 3.

Witnesses
Walter B. Hindmarsh
Marie Becker

Inventor
Joseph Becker

J. BECKER.
PHOTOGRAPHIC CAMERA.
APPLICATION FILED JULY 10, 1905.

1,103,342.

Patented July 14, 1914.
7 SHEETS—SHEET 7.

Witnesses

Inventor
Joseph Becker

UNITED STATES PATENT OFFICE.

JOSEPH BECKER, OF WASHINGTON, DISTRICT OF COLUMBIA.

PHOTOGRAPHIC CAMERA.

1,103,342.  Specification of Letters Patent.  Patented July 14, 1914.

Application filed July 10, 1905. Serial No. 269,048.

*To all whom it may concern:*

Be it known that I, JOSEPH BECKER, a citizen of the United States, residing at Washington, in the District of Columbia, have invented certain new and useful Improvements in Photographic Cameras, of which the following is a specification.

The present application for patent is identified, for convenience of reference in my other related applications, as Case K.

My invention relates to so-called copying or enlarging cameras, or cameras which comprise three essential parts, to wit: a lens frame or other means for supporting a lens, an image frame for holding the sensitized surface to be impressed and an object frame for holding the illuminated original, drawing, print, negative or other object to be copied or projected. The sensitized surface or image plane bears a certain fixed relation to the image frame, and similarly the object plane bears a fixed relation to the object frame; and as this object plane may also serve as image plane the two planes may be jointly referred to as the image planes. When these image planes are in proper relation to the lens, they coincide with conjugate foci of the lens; and, therefore, to any given relative position of lens and image plane on the one side of the lens, corresponds only one certain relative position of lens and image plane on the other side and this correct position is found by the process of focusing.

In enlarging cameras it is not easy under ordinary conditions to secure a sharp focus by the method of focusing with a ground glass, because the image is generally too faint to be clearly seen and because the image varies rapidly in size during the focusing operation, and this variation in size introduces variations in distinctness which are apt to be mistaken by the operator for variations in sharpness. Moreover, it is often required to make the image of a specified size, especially in copying charts or drawings, but, after the image has been sharply focused, the operator will generally find that it is either smaller or larger than desired. He, therefore, must change the distances and focus again, and this may have to be repeated a number of times before a satisfactory and not the best result is obtained by sacrificing sharpness to secure the exact size or by sacrificing accuracy in size to secure sharpness.

The main object of my invention is to do away with this troublesome tentative and uncertain process of focusing, and to permit of securing in all cases quickly and by positive means the sharpest attainable image of exactly any size that may be required.

To this end my invention consists in connecting the three frames by rods which are pivoted to the frames and to each other in such manner as to keep the image planes always in coincidence with conjugate foci of the lens.

My invention further consists in a very simple method of determining the positions of the frame pivots; also in a type of construction specially adapted to permit of applying such method; and, finally, my invention consists in other features, improvements, parts and combinations hereinafter described or claimed.

All claims made in the present application, Case K, being necessarily limited to the apparatus, claims to the method are reserved for, and made in, my divisional application, Case O, which was first filed February 9, 1910, under the Serial No. 542,842, and then refiled as a renewed application October 3, 1913, under the new Serial No. 793,262.

In the accompanying drawings: Figs. 19 to 22 show a modification of the combination shown in Figs. 7 to 12.

Figure 1:
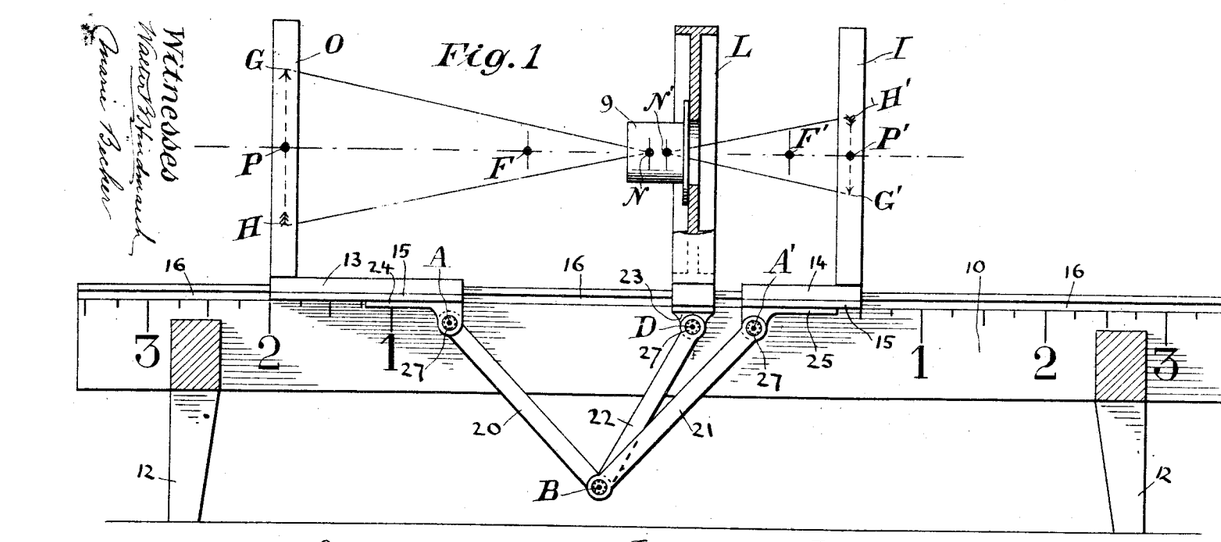
Figure 1 is a side view of a simple form of my invention, certain parts being broken away to show inside construction.
Figure 2:
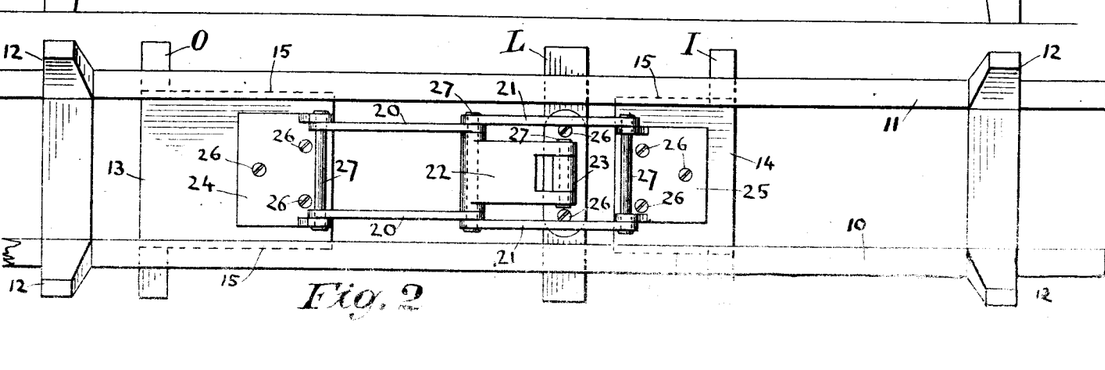
Fig. 2 is an inverted plan of the structure of Fig. 1.

In the forms of Figs. 1 and 2 L is the lens frame, I is the image frame and O is the object frame. These three frames may be of any preferred construction and a bellows may be provided to connect frames I and L and another to connect frames L and O; but as either or both of these bellows may in certain cases be dispensed with it is not necessary to show them. The lens frame L is firmly bolted or otherwise fixed on the shears or ways 10 and 11 of a suitable bench having legs 12. The object frame O is rigidly mounted on a carriage 13 and the image frame I is similarly mounted on a carriage 14. Carriages 13 and 14 have tongues 15 adapted to fit and slide in grooves 16 formed on the inner faces of the shears 10 and 11. The three principal frames I, L, O are connected, either directly or indirectly, by my linkage, comprising two equal links 20 and 21 and a shorter link 22. In order that the links shall never interfere in their movements, it is well to construct them so that the lens link 22 shall not move in the same plane as the others; and as a symmetrical construction is preferable the lens link 22 in the present form is made single and swings between the other links 20 and 21, which are made double, as seen in the inverted plan view, Fig. 2. This construction secures all the freedom of motion that may be desired and insures parallel motion of the carriages. The link 22 is hinged to frame L by a hinge or pivot bearing 23, and the links 20 and 21 are similarly hinged to their respective frames by pivot bearings 24 and 25. These different bearings are fastened in place by screws 26. The equal links 20 and 21, being virtually pivoted to the image planes, may be called the image links, and the other link 22, virtually pivoted to the lens, has already been referred to as the lens link. The four pintles of the linkage are designated by 27 and their geometrical axes are indicated in Fig. 1 by dots A, B, A′, D. Axes A, D and A′ may lie in any plane parallel with the direction of motion of carriages 13 and 14. As before stated, links 20 and 21 are equal. The length A B of the image links 20 and 21 and the length B D of the lens link 22 may have any values such that the difference of their squares shall be equal to the square of the focal length of the lens 9 used, that is, any values satisfying the following equation:

$$AB^2 - BD^2 = f^2 \quad (1)$$

The lens 9 may be either simple or compound. Its nodal points are indicated at N and N′, and its principal foci at F and F′, F being the focus of parallel rays from the right and F′ the focus of parallel rays from the left. The focal length $f$ of the lens, as well known, is the distance from F to N, or the equal distance from N′ to F′, and the vertical planes through N N′ are usually designated as the "principal planes." Points P and P′ are conjugate foci of the lens.

In order that the linkage and the lens shall coöperate, the linkage must not only satisfy equation (1) above, but the pintles must be so mounted on the frames that, when the frames are in focus on each other, the distance A D shall equal the distance P F and the distance D A′ shall equal the distance P′ F′, or in symbols:

$$AD = PF \quad (2)$$
$$DA' = P'F' \quad (3)$$

Equations (1), (2) and (3) are all satisfied in Fig. 1, as may easily be verified, and they will also be satisfied in any other relative position of the different parts: equation (1) because the lengths of the links are invariable; equation (2) because A and P move equally so that if A D be increased or decreased by any amount, P F will be increased or decreased by exactly the same amount; equation (3) for the same reason as equation (2), that is, because points A′ and P′ move equally.

*Theory of the device.*—A D being identical with P F, and D A′ identical with F′ P′, it only remains to show that A D and D A′, as dimensions of the linkage, vary according to the same law as the distances F P and F′ P′ of conjugate foci of the lens. In the following demonstration I shall first consider the lens and then the linkage.

Figure 3:
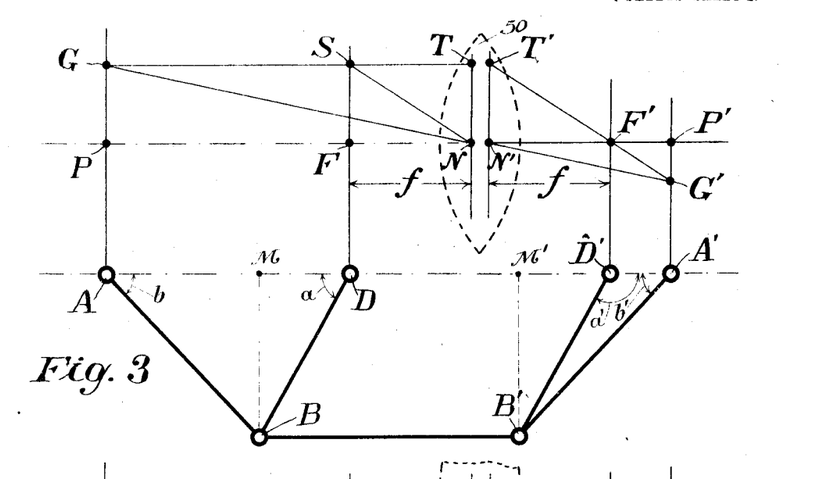
Fig. 3 is a diagram of another form of my linkage and of the lens with which it coöperates, the focal planes being spaced as in Fig. 1.

Referring to the upper part of the diagram, Fig. 3, in which the lens 50 is represented schematically by dotted lines, the image G′ of a point G is formed by following the courses of a ray G N directed to the nodal point of incidence N and the course of a ray G T parallel with the principal axis F F′. The nodal ray G N is simply offset by the lens and proceeds after emergence along N′ G′ parallel with its original direction, N′ being the nodal point of emergence. The parallel ray G T meets the first focal plane in S and the first principal plane in T which shifts to T′ in the second principal plane, and the emergent ray proceeds virtually from T′ parallel with S N through F′, the second principal focus, on to G′. The figure T S G N, having all its lines parallel to the lines of figure P′ F′ N′ G′, is similar to the latter, so that homologous or corresponding lines of the two figures are proportional, and, therefore, $$\frac{F'P'}{N'F'} = \frac{TS}{SG}$$

Noting that N′ F′ and T S are both equal to $f$, and that S G is equal to P F, the above equation yields $$\frac{F'P'}{f} = \frac{f}{SG} = \frac{f}{PF}$$

whence $$PF \cdot F'P' = f^2 \quad (4)$$

or $$F'P' = \frac{f^2}{PF} \quad (5)$$

This formula is much simpler than the usual lens formula which determines the image and object distances from the nodal points N and N'. Moreover, points N and N' are generally inaccessible, whereas points F and F' are easily located and can be used, as will be seen later, to greatly simplify the adjustment of my camera.

The theory of the linkage of Fig. 1 will follow directly from the theory of the linkage of Fig. 3. The linkage of Fig. 3, though less simple, most clearly illustrates all the principles involved, because the correspondence of its two sets of Newtonian space elements P F, F' P' and A D, D' A' is direct and most easily understood. The lens 50 is the same as in Fig. 3, is likewise represented diagrammatically in dotted lines, and, whatever its form, is fully determined for the present purposes by the position of its nodal points N and N' and of its principal foci F and F'. At D and D' in the principal focal planes F D and F' D' of the lens are pivoted equal lens links D B and D' B'. At A and A' in the image planes are pivoted equal image links A B and A' B'. The joints B and B' of these two pairs of links are connected by a link B B' equal in length to the distance D D' to form a jointed parallelogram B D D' B'. The lens is thus connected to image plane P by a pair of links D B A and to the conjugate plane P' by a similar pair of links D' B' A, and either pair satisfies equation (1) above. By considering triangle A B D we see that $$\overline{AB}^2 = \overline{BM}^2 + \overline{AM}^2$$

also that $$\overline{BD}^2 = \overline{BM}^2 + \overline{MD}^2$$

whence, by subtraction:

$$\overline{AB}^2 - \overline{BD}^2 = \overline{AM}^2 - \overline{MD}^2$$
$$= (AM + MD)(AM - MD)$$
$$= AD(AM - MD)$$

and as the last factor (AM−MD) is identical with (A'M'−M'D') or with D'A'

$$\overline{AB}^2 - \overline{BD}^2 = AD \cdot D'A' \quad (6)$$

As the links satisfy equation (1), we have $$\overline{AB}^2 - \overline{BD}^2 = AD \cdot D'A' = f^2$$

whence $$A'D' = \frac{f^2}{AD} \quad (7)$$

Now, assuming any value for the object distance P F, the image distance F' P' by the lens formula (5) above will be $(f^2 + PF)$; and, assuming the same value A D equal P F in the linkage, the distance A' D' by the linkage formula (7) will also be $(f^2 + PF)$. The linkage will, therefore, always hold plane A' in coincidence with the conjugate focus P' of P.

Figures 4, 5, 6:
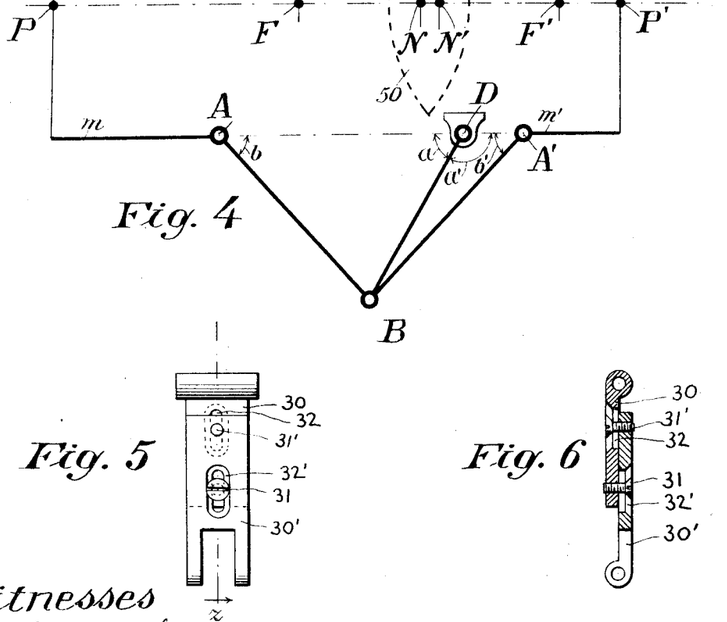
Fig. 4 is a diagram of the linkage of Fig. 1.
Fig. 5 is a face view of an adjustable form of link.
Fig. 6 is a section thereof on plane $z$ of Fig. 5.

By leaving the lens 50 and the image planes P and P', as in Fig. 3 and removing link B B', the triangle A B D may be shifted to the right and triangle A' B' D' may be shifted to the left until links B' D' and B D coincide and merge into one link B D, as in Fig. 4, where the points A and A' of the linkage are connected to the image planes by bars m and m'. The length of bars m and m' may have any values, except that their algebraic sum must equal the distance D D' of Fig. 3 or the distance F F' in the lens, that is, equal to twice the focal length of the lens, plus the distance N N' between the nodal points. But Fig. 4 just considered has the same horizontal dimensions as Fig. 1, and is the diagrammatic representation of Fig. 1. It is, therefore, clear that if a properly lighted object be mounted in one of the two focal planes P or P' of Fig. 1, its image will be seen sharply focused in the other focal plane, and that this will be so in all positions of the mechanism and frames. If the frames are moved, the diameter of the image will be seen to increase or to decrease, according to the direction of the motion, but its sharpness will remain constant, except in so far as sharpness may be affected by the scale of reduction or enlargement. In the proportions of Figs. 1 and 2 the diameter of the image may be increased up to over three times (7/2) the diameter of the original, and it may be decreased down to less than one-third (2/7), giving a range of 4 to 49 or exceeding 1 to 12, that is, the smallest image has a diameter less than one-twelfth of the largest. These are about the limits of the device as shown in Fig. 1, but the range can be increased, if desired, by making the ways 10 and 11 longer and lengthening the links 20, 21 and 22 to correspond. The operator, knowing that the image is sharply focused, has, therefore, nothing to consider but size, if size be of importance to him. He may control the size by direct inspection or measurement of the image, but to avoid this I preferably use a scale. Scales have heretofore been used in enlargement cameras, mainly for the purpose of focusing; but as I focus mechanically I have devised an improved scale that is specially adapted to co-operate with my linkage.

*Scale of enlargement and reduction factors.*—This scale is marked in fixed relation to the lens, in any convenient place, and in the present case on top of the bench or on the outside edge thereof. To save additional illustration it is repeated in Fig. 1 on the inside face of rail 10. The graduation comprises a graduation 1, 2, 3 at the left for the object frame O and a similar graduation 1, 2, 3 at the right for the image frame I, and the numbers indicate enlargement factors. Thus frame O, as seen in the figure, registers with enlargement factor 2, which means that G H is twice G' H'. Frame I must then register with reduction factor ½ of its scale, as seen, to indicate that G' H' is one-half of G H. The divisions of this scale, that is, the divisions of the reduction factors, are small, crowded and irregular and as the linkage permits of dispensing with one scale I prefer to do away with all graduations below 1 on both scales and to set the frames in all cases, whether for enlargement or for reduction, by means of the enlargement factor. That is to say, either scale sets its frame for enlargements and sets the opposite frame, by means of the linkage, for the corresponding reductions. The two enlargement scales, therefore, act as a combined enlargement and reduction scale. This is a great advantage, especially as the steps of the enlargement scales are uniform; that is to say, the distance 1 to 2 equal the distance 2 to 3, and either of these is equal to the focal length of the lens and the steps may be uniformly divided for intermediate values. The principle of the enlargement scale can be demonstrated by Diagram 3, where the enlargement factor $$n = \frac{GP}{G'P'} = \frac{TN}{G'P'} = \frac{GS}{N'F'} = \frac{PF}{f}$$

whence $$PF = nf = AD \quad (8)$$

and in similar manner it can be shown that $$P'F' = \frac{1}{n}f = D'A' \quad (9)$$

The distances for the enlargement factors are, therefore, seen to vary in direct proportion to $n$ and the distances for the corresponding reduction factors vary in indirect proportion; the first scale being uniform and well spaced, the latter irregular and crowded. With this improved scale and the linkage, the operator pays no attention whatever to the image. He directly inserts his sensitive paper plate or film and selects his factor of enlargement or reduction, say, for instance, 2½. If the factor is an enlargement factor, it is the image frame I that he sets at 2½, and if it be a reduction factor it is the object frame O that he sets at 2½. Then he exposes and without ever having seen the image he knows that he has secured the sharpest attainable image of exactly the size desired.

In copying drawings or charts it is necessary to first make a negative form which the final positive prints are made, and to reduce expense the negative is often made very small. My device is well adapted to make both the negative and the positive, and in this case the combined enlargement and reduction scale is a very great convenience.

*Adjustments.*—If lenses could easily be made of a certain focal length, there would be no difficulty in manufacturing the device as just described. It is well known, however, that even the highest price lenses are never expected to be of exactly their intended focal length. In assembling the linkage and camera elements in the factory it is, therefore, necessary to allow for departures that may be present in the focal length of the lens. A number of different methods may be followed. The simplest, to be given later, requires special features of construction not present in the structure of Figs. 1 and 2, and I shall, therefore, first give a method that can be applied to the structure of Figs. 1 and 2. Bearing 23 is supposed to be fastened in place, that is, wherever convenient, but bearings 24 and 25 are supposed to be unmounted. If bearing 23 be mounted midway between the principal planes N, N' of the lens, the other two bearings will have to be at equal distances from their respective image planes and the construction will be symmetrical; but if bearing 23 be mounted closer to one of the two focal planes F, F' than to the other the structure will be unsymmetrical, as in Fig. 1. Symmetry is not essential in my device, and, therefore, the bearing 23 is preferably mounted in the most convenient place, which in the present instance is directly on the lens frame itself, as shown. Bearing 23, therefore, being mounted: first, measure the focal length of the lens by any known method; second, construct the linkage to satisfy equation (1); third, temporarily clamp one of the frames O or I to the bed and mount a test object in its image plane, and sharply focus the other frame, clamping it also. Fourth, measure any line G H in the object and the length G' H' of its image to calculate $n$, the factor of enlargement; fifth, mount and fasten bearing 24 so as to satisfy equation (8); sixth, fasten bearing 25 to satisfy equation (9); seventh, mount the linkage which should now fit exactly. The second step above can be left to the last. That is, bearings 23, 24 and 25 are all fastened as indicated above; then links 20 and 21 are mounted and the distance B D is measured to construct link 22. The short link 22 may also be made adjustable in length in any suitable manner, as indicated, for instance, in Figs. 5 and 6, by making it of two parts 30, 30'. Part 30 is threaded near one end to receive a screw 31 and part 30' is similarly threaded to receive a screw 31'. Slots 32 and 32' permit the parts to slide upon each other when the screws are loosened. When link 22 is thus made adjustable, it is no longer necessary to measure the distance B to D, as proposed above, for the screws 31, 31' are simply loosened enough to permit the short link to extend or contract freely so it may be inserted and mounted in place and then firmly clamped to the length that it has automatically assumed during the mounting operation.

The adjustment might be made in the two long links or elements A B and B C, instead of in the short link or element B D, but adjustment of the short link is simpler.

*Improved form.*—It is seen that the manufacture of accurately operative devices of the form of Figs. 1 and 2 involves considerable trouble and is, in fact, impracticable, even when the adjustable lens link of Figs. 5 and 6 is used. I have fortunately discovered a method of adjustment that permits of dispensing with all measurements, dispensing even with the measurement of the focal length of the lens; but this method involves a novel principle of construction which consists in so forming the device that the bearing of axis D shall admit, or be admitted by, either of the other bearings in such manner that the axes A and D or the axes A' and D may be brought into exact coincidence.

Figure 7:
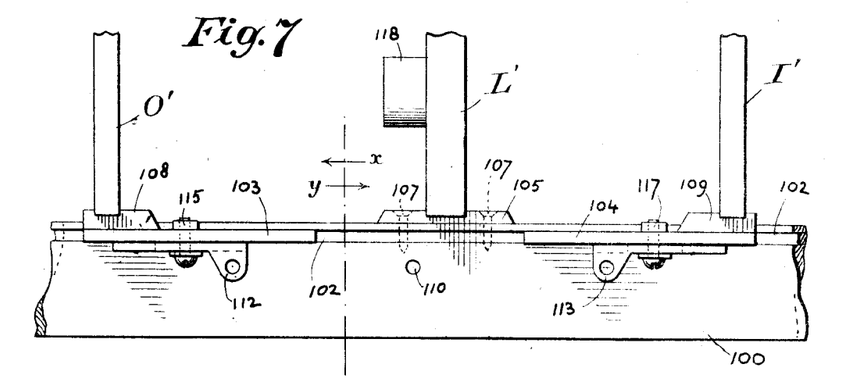
Fig. 7 shows a form adapted to carry out my improved method of properly setting the pivot bearings, the view being similar to Fig. 1, but with the linkage omitted for clearness.
Figure 8:
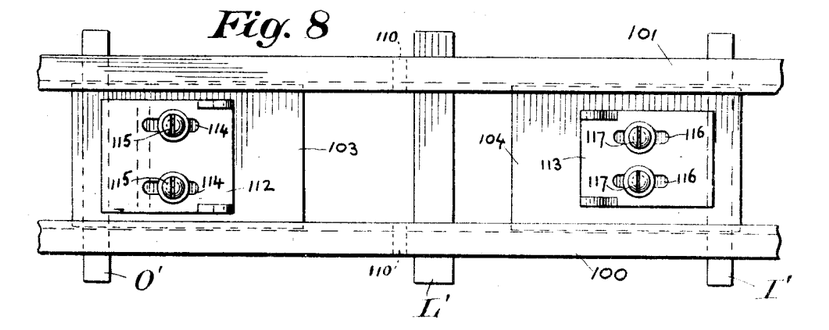
Fig. 8 is an inverted plan of the same.
Figure 9:
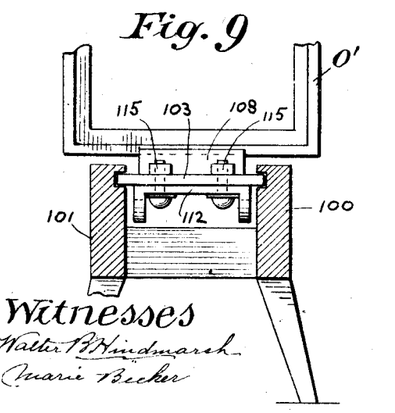
Fig. 9 is a section on plane $x\,y$ of Fig. 7, looking in direction of arrow $x$.
Figure 10:
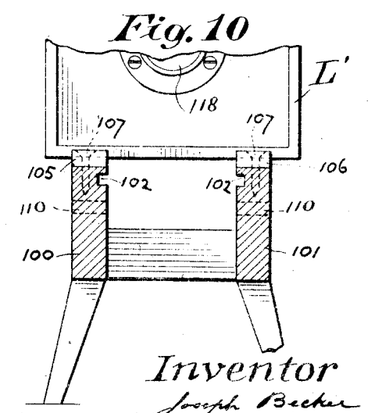
Fig. 10 is the same section, looking in the direction of arrow $y$.

Referring to Fig. 1, it will be remembered that, when the apparatus is in perfect adjustment, the distance F' P' is always equal to D A' and that the distance F P is always equal to A D. If F' P' could be reduced to zero, D A' would also become *nil*, and if F P could be reduced to zero, A D would become *nil*. That is, the hinges would interpenetrate so as to have their axes in coincidence. But, when F P is *nil*, frame O is in focus on parallel rays from the right, and, when F' P' is *nil*, frame I is in focus on parallel rays from the left. My method of adjustment, therefore, consists in first fixing one of the axes, say, axis D, and then using it as a guide for setting the other two axes, by focusing on infinity. A structure that permits of applying this method is shown in Figs. 7, 8, 9, 10, 11 and 12. The object frame O', the image frame I', the lens frame L' and the bench comprising shears 100 and 101 are all substantially as in Fig. 1, but the groove or slide way 102 formed in the shears is continued without obstruction under the lens frame L. To insure a clear passageway for the carriages 103, 104, frame L' is, furthermore, raised on blocks 105, 106, which are fastened to rails 100 and 101 by screws 107. Frame O' is rigidly mounted on its carriage 103 by means of a block 108, and frame I' on its carriage by a block 109. The bearing for the lens axis D is simply formed by a bore 110 in shears 100, 101, as best seen in Fig. 7, to admit a pin 111, best seen in Figs. 11 and 12. The bearing 112 for the object axis A and the bearing 113 for the image axis C may be exactly as in Fig. 1, but, I preferably mount them as seen in Fig. 8; that is, I form in bearing 112 a pair of slots 114 to admit screw bolts 115. Bearing 113 has similar slots 116 to admit bolts 117. The linkage comprising the image links 120, 121 and the lens link 122, 123 (Fig. 12) is exactly as in Fig. 1, but with the lens link adjustable as in Figs. 5 and 6.

Figure 11:
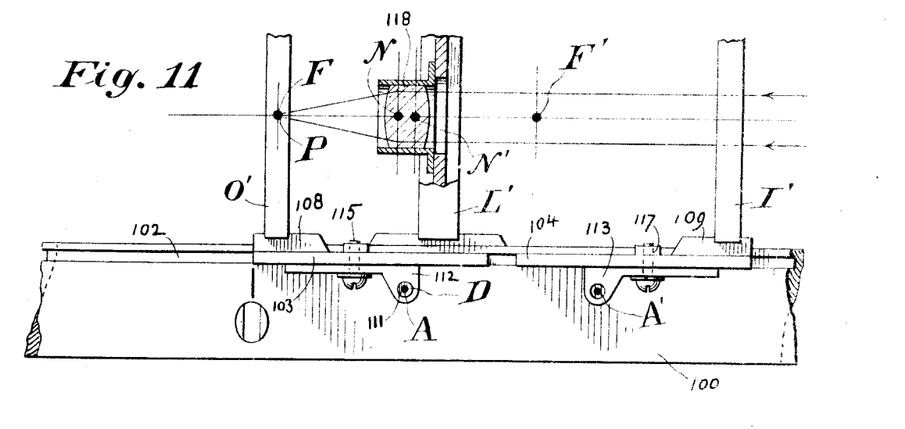
Fig. 11 is a view similar to Fig. 7, but illustrating the adjustment of one of the frame pivots.
Figure 12:
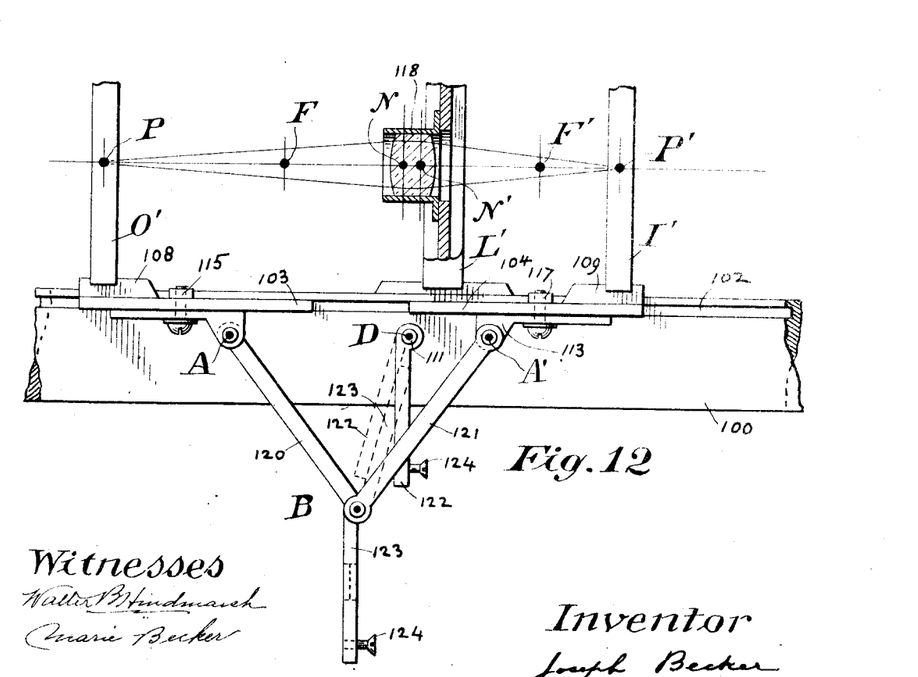
Fig. 12 is similar to Fig. 11, showing the linkage and how it is adjusted.

Having mounted the lens 118 in frame L', the adjustments are made as follows: The links 120, 121 and 122, 123 are removed so as to leave the structure as in Fig. 7. Frame O' is then slid up, as in Fig. 11, to bring the bore of its bearing 112 in alinement with the bore 110, and pin 111 is inserted to secure perfect coincidence of axes A and D, as indicated in Fig. 11. Screws 115 are now loosened and frame O' is sharply focused on a distant test object to the right, that is, on parallel rays from the right. This brings image plane P into exact coincidence with the principal focal plane F of the lens. Screws 115 are then tightened and axis A is thus firmly and accurately fixed in proper relation to its image plane P. Pin 111 is withdrawn and frame I' is now pushed in to bring the bore of its bearing 113 in alinement with bore 110, and pin 111 is again inserted to secure perfect coincidence of axes A' and D. The bearing 113 is loosened, frame I' is then focused on left infinity to bring its image plane P' into coincidence with the principal focal plane F' of the lens. Screws 117 are then tightened and axis A' is thus firmly and accurately fixed in proper relation to its image plane P'. The linkage is now mounted as indicated in full lines, Fig. 12, that is, with the lens link entirely open to leave the carriages 103, 104 perfectly free. Frame O' is now set in any position, say, in the position seen in Fig. 12, and is preferably clamped in any suitable manner. A test object is mounted in its image plane P and frame I' is then sharply focused on P and similarly clamped. The lower member 123 of the lens link is now turned up against member 122 and these two members are firmly secured together by inserting the screws 124. The linkage now satisfies equation (1) because the product A D . D A' equal to $$(\overline{AB}^2 - \overline{BD}^2)$$

by equation (6) is identical with P F . F' P' or equal to $f^2$. The device, therefore, satisfies all the theoretical conditions and frames I' and O' may be unclamped for use.

As it may be inconvenient to have test objects at both right and left infinity, it will generally be easier to turn the apparatus end for end and focus on only one well selected distant object, and if any difficulty be experienced in finding such an object, the focusing may be done on the parallel rays produced by a collimator. If special refinements be used in focusing to adjust the camera, the camera will give the same degree of accuracy when used to make exposures.

No measurements and no calculations are required with the apparatus of Figs. 7 to 12. Its different parts are constructed and simply assembled ready for adjustment, and the adjustment is made by only three focusing operations, such as made with an ordinary camera, without paying any attention either to size of the image, or to focal length, or to any other dimension. The apparatus as made in Figs. 7 and 12 may, therefore, be put on the market without a lens, with instructions such as those above, for correctly adjusting it. As it is better not to make the device excessively large and to make the latitude of adjustments small, it is preferred to manufacture the device in several sizes corresponding to the focal lengths of objectives commonly used in hand cameras so that the purchaser may use his own camera lens. When either frame is focused on infinity it corresponds to the zero of its graduation of enlargement factors, as may be seen by making the factor $n$ equal to zero formulæ (8) and (9). This zero is shown marked in Fig. 11 for frame O', although it can never serve after the linkage has been mounted and adjusted except as an aid in making the graduation. The graduation, however, if required, may so easily be made, by direct measurement of the image after the linkage has been mounted and adjusted to focus, that no other method need be used.

Figure 13:
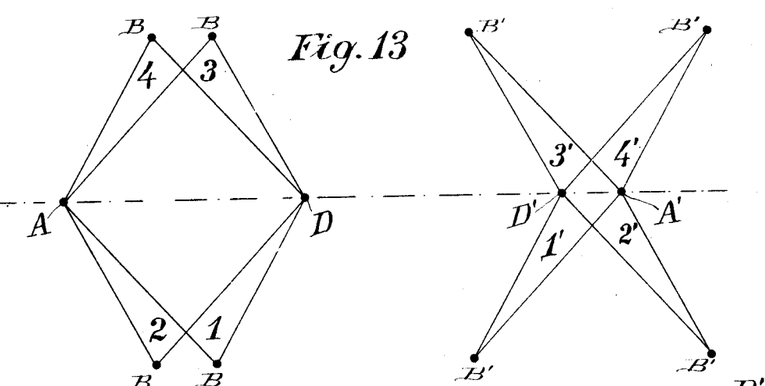
Fig. 13 is a diagram of different arrangements of my linkage.
Figure 14:
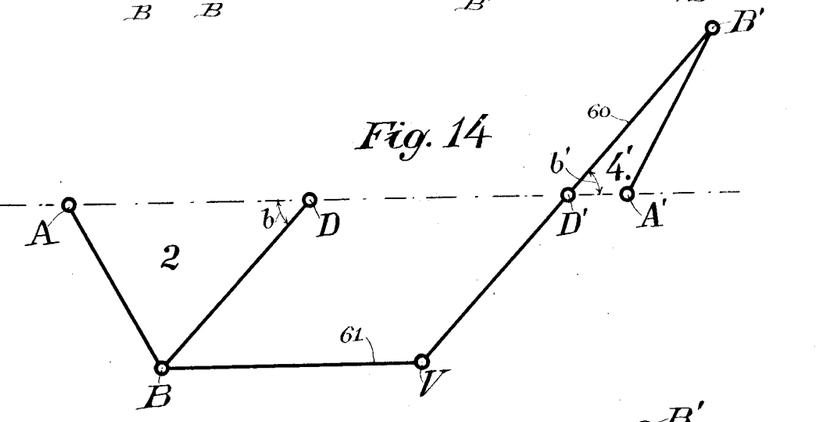
Fig. 14 shows a form of linkage in which the image links are the longer links.

*Modified forms.*—By referring to Fig. 3, it will be seen that the lens axis D is connected to the image axis A' by a crank and pitman connection or two unequal links which form a triangle A B D, and that the lens axis D' is connected to the other image axis A' by two similar unequal links forming another triangle A' B' D'; also that the bases A D, A' D' of these two triangles are variable and are caused to vary together by employing means to compel the angle $a$ opposed to the longer link in triangle A B D, and the angle $a'$ opposed to the longer link in triangle A' B' D' to remain supplementary, that is, to always form two right angles when added. The angles $b$ and $b'$ opposed to the shorter links, therefore, also vary, but remain equal. A great number of other types may be derived either with or without shift, by changing the position of these same triangles on their base lines. Thus, as seen in Fig. 13, triangle A B D may, without any change in length or position of its base A D, be set in either one of the four different positions indicated by 1, 2, 3 and 4; and triangle A' B' D' may similarly be set in four different positions 1', 2', 3', 4'. The positions referred to by uneven numbers are those in which the lens link is the shorter link, and the positions referred to by even numbers are those in which the lens link is the longer link. Any one of the four triangles on base A B may be used in combination with any one of the four triangles on base A' D'; and, furthermore, any number of the six remaining triangles shown may be added to the combination, if desired. Thus by taking 2 and 4' the linkage of Fig. 14 is formed. Here the link 60 is produced as a lever to V and joined to B by a link 61 equal to D D' to form the parallelogram B D D' V and compel the angles $b$ and $b'$ to remain equal. By a shift of the triangles, such as that made to pass from the type of Fig. 3 to the type of Fig. 4, this linkage of Fig. 14 becomes the very simple form shown in Fig. 15, which may be considered as typical of those forms of the linkage in which the image links are both short links, while Figs. 3 and 4 are typical of the forms in which the image links are both long links.

Figure 15:
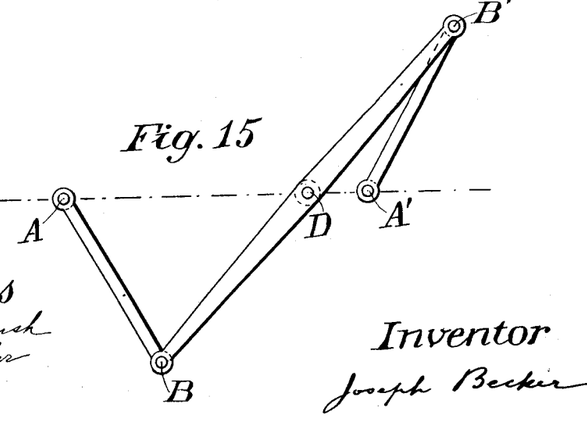
Fig. 15 is a simplification thereof.
Figure 16:
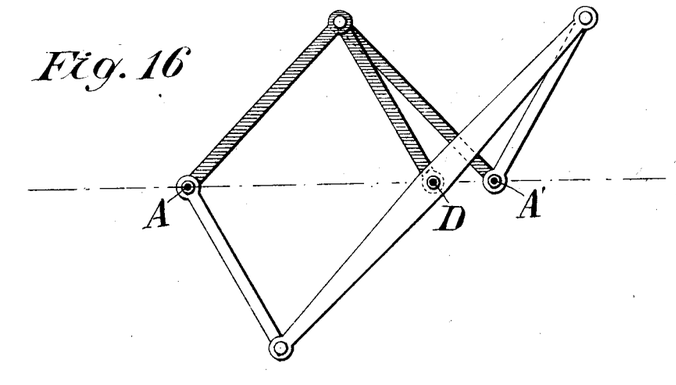
Figs. 16, 17 and 18 show compound forms of the linkage.

A form in which both long and short links are connected to the same axes is shown in Fig. 16. This is formed by taking triangles 2, 3, 3' and 4' of Fig. 13. This linkage may be considered as the linkages of Figs. 4 and 15 combined to coöperate, and it has the advantage that its pivot axes A, D and A' will remain in perfect alinement without a slideway because point A', for instance, is connected to points A and D by truss connection and is thus held in alinement with them, so that no useless side pressures are put on the slides and very smooth action is secured. To permit of clearly distinguishing the two sets of linkage, one set is shaded with horizontal lines.

Figure 17:
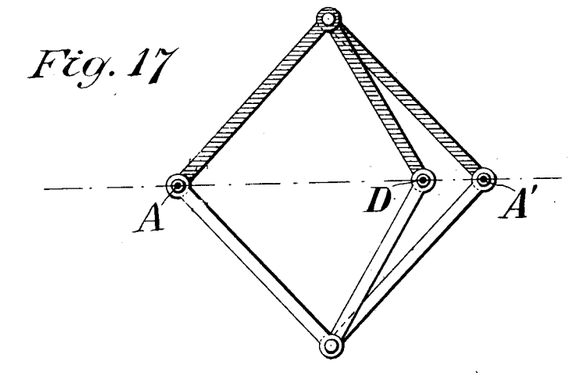
Figure 18:
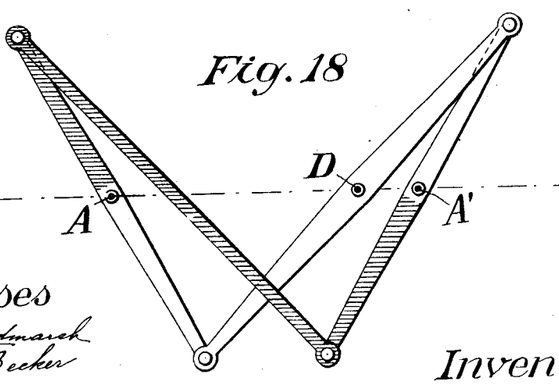

By taking triangles 1, 3, 1' and 3' of Fig. 13 the compound linkage of Fig. 17 is formed, and by duplicating the linkage of Fig. 15, and reversing about an axis perpendicular to A A' in the plane of the drawing, the linkage of Fig. 18 is formed.

The forms of Figs. 17 and 18 are both old as elements in straight line or so-called parallel motion mechanism. Fig. 17, for instance, comprises six of the seven links used in Peaucellier's working beam, in the special form of it shown in Fig. 413, p. 501, of Klein's translation of Weisbach's "*Mechanics of Engineering*," Vol. III, part I, section 1. New York, 1883. See also the four different straight line linkages in Figs. 26 (1), 26 (2), 26 (3) and 26 (4) on page 501 of the Phillips and Fisher, "*Elements of Geometry*," published and copyrighted by Harper and Brothers, New York, 1896;

noting that any linkage such as that of Fig. 26 (1) in which the constant product vectors O P and O Q are similarly directed, must have one of such vectors reversed, as by pantographic modification Fig. 26 (4), to be usable as focusing gear.

Figures 19, 20, 21, 22:
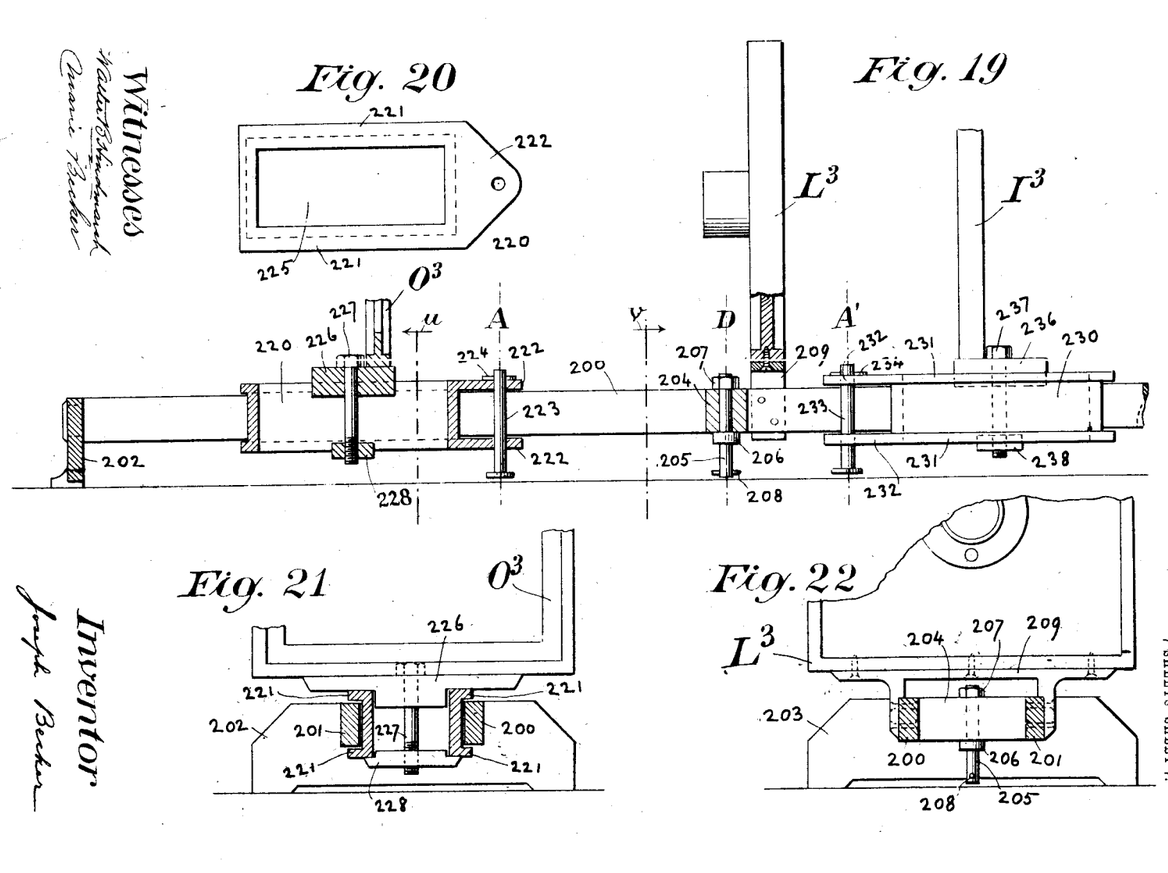
Fig. 19 being a longitudinal section with the right carriage in side elevation and the extreme right end of the bench broken away.
Fig. 20 a plan of the left hand carriage shown separately.
Fig. 21 a section on plane $u$ of Fig. 19.
Fig. 22 a section on plane $v$ of Fig. 19.

All the linkages shown in the drawings merely serve to form a crank and pitman connection between the lens and either image plane and to cause the two connections to move so that the angles $a$ and $a'$ opposed to the longer links shall be and remain supplementary, this being the fundamental principle of my invention. Any linkage, therefore, containing links that satisfy these conditions may be used, provided the links thereof that correspond to my crank and pitman are proportioned to satisfy equation (1). However, forms of the type shown in 15, 16, 17 and 18 are not directly applicable to the arrangements of Figs. 1 and 2 or to that of Figs. 7 to 12 because a part of these linkages would be interfered with by the lens frame. To avoid this difficulty, I mount them on either side of the camera; or horizontally on top and on the bottom of the camera. When mounted on the top or on the bottom, one set is sufficient. An arrangement which is suitable for any side of the camera is shown in Figs. 19 to 22, as applied to the bottom. The bed here comprises two parallel bars 200, 201, connected at their ends to cross pieces 202, 203 which serve as feet. At the middle the bars have a solid cross piece 204 which is adapted to support the lens pintle 205 which is made with an integral collar or shoulder 206 and held solidly by a nut 207 at its upper end. At the lower end the pin 205 has a cotter or pin 208 by means of which the linkage is to be held on the pin. Close to bar 204 is rigidly fastened a bridge piece 209 upon which is firmly screwed the lens frame $L^3$ as shown. As seen in Fig. 22, this bridge piece is intended to form a space under the lens frame to leave the way clear for the carriages 220, 230. The carriage 220 carries the object frame $O^3$ and carriage 230 carries the image frame $I^3$. Carriage 220 has lateral rectangular grooves formed by flanges 221 adapting it to fit and slide freely along between the bars 200, 201. The flanges 221 are carried around and at the lens end of the carriage are extended to form bearings 222 for the image pin 223 which is held in place by a cotter or pin 224. Through the body of the carriage 220 is formed a large rectangular opening 225. Fig. 20, the longer walls of which act as a guideway for a block 226 upon which is firmly mounted the object frame $O^3$. This block carries a cap screw 227 which is threaded into a cross-bar 228. The frame $O^3$ may be set where desired on carriage 220 by first loosening screw 227 and then tightening it. Carriage 230 is in every respect similar to carriage 220. Its parts 231 to 238 correspond exactly to the correspondingly numbered parts 221 to 228 of carriage 220.

By removing all the three pins 205, 223, 233 either carriage may be pushed in to bring its axis A or A' into coincidence with axis D. Frames $I^3$ and $O^3$ may, therefore, be set each in proper relation to its respective axis by the method of focusing on infinity as set forth above in connection with Figs. 7 to 12. The only difference to be noted between the adjustments of Fig. 7 and those of Fig. 19 is that in Fig. 7 the bearing is adjustable on the slide, while in Fig. 19 it is the image frame that is adjustable on the slide.

In the structure of Figs. 19 to 22 any one of the linkages shown in the drawings may be used. If that of Fig. 17 be used its two lens links should be made adjustable and the linkage may evidently be mounted and adjusted as explained in connection with Fig. 12.

In all forms shown the lens frame is the stationary frame, but it will be understood that either of the image frames may be stationary instead without any change in principle.

My contributions to the art in general terms may be summed up as follows:

(a) I am the first to devise a focusing mechanism which is adjustable for use with different lenses and which contains the particular adjustments that, according to the Gaussian theory of lenses, are necessary and adequate to permit of surely securing the highest available efficiency of any lens that is to be used with such mechanism.

(b) My focusing mechanism, composed solely of parts assembled in purely pivotal relation, is the first and only one ever proposed that does not contain slides in addition to the main slide-ways or rail-bed of the camera.

(c) My camera is the first to be adjusted and regulated ready for use without paying any attention to the nodal points, or to a so-called "optical center" and without even knowing the focal length of the lens used.

*General Remarks.*—Note 1. The two free longitudinal adjustments provided in the frame connections (Fig. 8 or Fig. 19) permit of separately and independently satisfying equations 2 and 3; and the third independent adjustment (Fig. 6) provided in the mechanism proper permits of independently satisfying equation 1.

Note 2. These three entirely free and independent adjustments, or their equivalents, are useful in any conceivable form of focusing mechanism and they are indispensable if the highest available efficiency of the lens must surely be attained.

Note 3. In applying my infinity method of satisfying equations 2 and 3 to any other form of type or focusing mechanism all that need be done is to identify the necessarily present (but often more or less concealed) co-varying constant product space elements A D, D' A' of the mechanism, which correspond, respectively, to the co-varying Newtonian distances P F, F' P' of the lens.

Note 4. I am aware that mechanism for directly determining the Newtonian distances P F, F' P' somewhat as in the upper part of my Fig. 3 has been proposed diagrammatically by Professor Elie in the *Journal de Physique*, Paris, 1880, pp. 162 to 164; also that this project is entitled an "articulated mechanism," but I believe that it cannot possibly be realized without introducing pin and slot or similar sliding connections.

Note 5. I am aware that pin and slot or radial cam focusing mechanism is shown in direct combination with a copying camera in German Patent 102,004 of 1897 to Carpentier, and that this mechanism determines two co-varying constant product and alined space elements B O and O B' (Fig. 2); but this patent does not explain how to make allowance for the internodal space N N', and refers instead to a so-called "optical center."

Note 6. I am aware that Floquet in the *Bulletin des Séances de la Société des Sciences de Nancy* for May, 1898, pp. 10 and 11, (copy at Library of Congress) proposes to construct the Carpentier camera by locating the Carpentier lens pivot midway between the two principal or nodal planes N and N' and by mounting the end frame pintles at a distance equal to $f$ plus $\frac{1}{2}$ of N N', from their respective image planes; and that this rule of Floquet does make proper allowance for the internodal space N N'; but the Floquet rule is not sufficiently general for my purposes, as I make no attempt whatever, except in my theoretical form, Fig. 3, to place my lens pivot or lens pivots in any definite or even known longitudinal relation to the lens.

Note 7. I am aware that Cook in his British Patent No. 12,734 of 1904 (line 44, p. 9, to line 2, page 10) refers to the possibility of so designing his apparatus that the focusing mechanism and connecting points as a whole shall be shifted longitudinally with relation to the three frames O, L, I; but, according to Cook (lines 56, 57, p. 9), after such shift has been made, "the total distance between the image planes must be equal to four times the focal length of the lens," whereas, in accordance with my disclosures, this same distance should be (4f+NN') or four times the focal length of the lens plus the internodal distance N N'.

Note 8. I am aware that the diagonal adjustments of the end frame pintles $p$, $p$ and $q$, $q$ of Cook (Fig. 8) in guideways $t, t$ and $s, s$ have longitudinal components, which are parallel to the lens axis and which constitute "longitudinal adjustments;" but such longitudinal adjustments in Cook are, and in any case must be, equal hence not independent because, as correctly stated by Cook in lines 46 to 49, page 9, "it is necessary" that the distances of pins $p$, $p$, $q$ and $q$, Fig. 8, from the transverse fulcrum plane $o$ $o$, Fig. 8, "should each be equal to the 'focal length $f$' of the lens when the apparatus is at unity".

Note 9. I am aware that Frécot published at Nancy, France in the *Bulletin de la Société Lorraine de Photographie* for May, 1898, pages 95 to 115, a comprehensive article on focusing gear (detached copy at the Library of Congress in book marked *Frécot-Chambres d'Agrandissement* No. TR475.F8) which discloses or refers to adjustments that are to be distinguished from mine, as follows: I am aware that Frécot shows in Figs. 1 and 2, page 102, a longitudinal adjustment of his object frame pintle G (referred to in lines 6 and 7, page 103; lines 18 to 24, page 104, and lines 1 to 3, page 107); and that he mentions a longitudinal adjustment of the image frame connection in lines 25 to 31, page 107, but in the latter passage he excludes any other longitudinal adjustment. The full official card catalogue title of this Frécot document is: Frécot, G., *Méthode simple pour établir les éléments de plusieurs systèmes mécaniques au moyen desquels on peut transformer à volonté une chambre d'agrandissement ordinaire en une chambre d'agrandissement toujours au point automatiquement quel que soit l'agrandissement*.

Note 10. I am aware that Claudet in *The Journal of the Photographic Society of London*, of March 15, 1861 volume 7, 1862, pages 133 to 139, and that R. H. B. (referred to page VI as R. H. Bow) in the *British Journal of Photography*, of December 1, 1865, volume 12, London, 1865, page 608, lines 18 to 43, disclose an infinity method of establishing a focusing scale, but such method is not used as in my camera for determining the dimension of a constituent element of automatic focusing mechanism.

Note 11. I am aware that regulation of the Carpentier camera of German Patent 102,004 is alluded to in the *Comptes Rendus*, Paris, 1898, Vol. 126, page 895, lines 15 to 23; also in the *Scientific American Supplement*, New York, 1898, page 19170, column 2, lines 18 to 9 from the bottom; but such regulation does not necessarily comprise adjustments, and it is, furthermore, confused by reference to 3 different lens centers; whereas, I use only 2, to wit: the nodal points N and N'.

What I claim as my invention and desire to secure by Letters Patent is:

1. The combination with a photographic camera, comprising a lens support, an image support and an object support, and ways adapted to guide two of said supports with relation to the third; of mechanism for connecting the said three supports to compel two of them to move simultaneously with relation to the third, said mechanism consisting in an assemblage of pivoted rods.

2. The combination with a photographic camera, comprising a lens support, an image support and an object support, and ways adapted to guide two of said supports with relation to the third; of mechanism for connecting the said three supports to compel two of them to move simultaneously with relation to the third; said mechanism consisting in a crank and pitman connection between the lens support and either image support to form two variable triangular connections between such supports; and means for causing the angles of such triangles that are opposed to the pitmen or longer members to be and remain supplementary throughout all variations of the said triangles.

3. The combination with a photographic camera, comprising a lens support, an image support and an object support, and ways adapted to guide two of said supports with relation to the third; of mechanism for connecting the said three supports to compel two of them to move simultaneously with relation to the third, said mechanism consisting in a linkage comprising three rods, one pivoted to the lens support, the second to the image support and the third to the object support and a pivot connecting the three rods.

4. The combination with a photographic camera, comprising a lens support, an image support and an object support and slideways adapted to guide two of said supports with relation to the third, of a pintle or pintle bearings mounted in fixed relation on each one of the said three supports in a direction perpendicular to the direction of motion in the said slideways, and means for freely adjusting two of said pintles or pintle bearings on their respective supports in the direction parallel to the said slideways; also focusing mechanism for connecting said pintles or pintle bearings.

5. The combination with a photographic camera, comprising a lens support, an image support and an object support, and ways adapted to guide two of said supports with relation to the third; of mechanism for connecting the said three supports to compel two of them to move simultaneously with relation to the third, said mechanism consisting in a linkage comprising three rods, one pivoted to the lens support, one pivoted to the image support and the third to the object support; a pivot connecting the three rods, and means for adjusting the length of the lens link.

6. The combination with a photographic camera, comprising a lens support, an image support and an object support, and ways adapted to guide two of said supports with relation to the third; of a bearing mounted on each of these three supports, said bearings being adapted to have their axial lines brought into coincidence by moving the said supports in the slideways also focusing mechanism mounted in and connecting the said bearings.

7. The combination with a photographic camera, comprising a lens support, an image support and an object support and ways adapted to guide two of said supports with relation to the third; of bearings mounted on each of these three supports, said bearings being adapted to have their axial lines brought into coincidence by moving the said supports in the slideways, and means for adjusting the relative position of two of said supports to their respective bearings also focusing mechanism mounted in and connecting the said bearings.

8. The combination with a photographic camera, comprising a lens support, an image support and an object support, and ways adapted to guide two of said supports with relation to the third; of mechanism for connecting the said three supports to compel two of them to move simultaneously with relation to the third, said mechanism consisting of rigid parts connected to each other in pivotal relation.

9. The combination with a copying or enlarging camera comprising a support for an object plane, a support for a lens, and a support for an image receiving plane; also a bed or slideway for said three supports to permit of displacing them as required to secure images of different sizes; of focusing mechanism having three independent connections with said three supports to cause two of such supports to move with relation to the third; and adjustments in at least two of said three independent rigid connections to provide free adjustment of such adjustable connections in the longitudinal direction parallel to the slideway of the camera bed.

10. The combination with a copying or enlarging camera comprising a support for an object plane, a support for a lens, and a support for an image receiving plane; also a bed or slideway for said three supports to permit of displacing them as required to secure images of different sizes; of focusing mechanism having three independent connections with said three supports to cause two of them to move with relation to the third; and adjustments in two of said three independent connections to provide free adjustment of such two adjustable connections in the longitudinal direction parallel to the slideway of the camera bed, so that the third independent connection may be made longitudinally arbitrary and invariable, regardless of the proportions of the lens to be used in the camera.

11. The combination with a copying or enlarging camera comprising a support for an object plane, a support for a lens, and a support for an image receiving plane; also a bed or slideway for said three supports to permit of displacing them as required to secure images of different sizes; of focusing mechanism having three independent connections with said three supports to cause two of them to move with relation to the third; and adjustments in at least two of said three independent connections to provide free adjustment of such adjustable connections in the longitudinal direction parallel to the slideway of the camera bed.

12. The combination with a copying or enlarging camera comprising a support for an object plane, a support for a lens, and a support for an image receiving plane; also a bed or slideway for said three supports to permit of displacing them as required to secure images of different sizes, and focusing mechanism having three independent connections with said three supports to cause two of them to move with relation to the third; of two independent longitudinal adjustments in said connections and one independent adjustment in the said mechanism.

13. The combination with a copying or enlarging camera comprising a support for an object plane, a support for a lens, and a support for an image receiving plane, also a bed or slideway for said three supports to permit of displacing them as required to secure images of different sizes; of focusing mechanism adapted to produce constant product space elements P F and F' P' with means to permit of reducing either of such constant product space elements to zero value.

14. The combination with a copying or enlarging camera comprising an object plane, a lens, and an image receiving plane, also suitable supports and a bed or slideway for said three supports to permit of displacing them as required to secure images of different sizes; of focusing mechanism with means to permit of reducing either of the co-varying Newtonian space elements of such mechanism to zero value.

15. The combination with a photographic camera comprising a support for an object plane, a support for a lens, and a support for an image receiving plane; also focusing mechanism having three separate connections with said three camera supports to cause two of them to move with relation to the third; of longitudinal adjustments in two of said three separate connections to permit of making due allowance for all possible variations in the extent, sign and location of the internodal space N N' of the lens to be used; and an adjustment in the focusing mechanism to permit of making due allowance for all possible variations in the focal length of the lens; each of said three adjustments being independent of the other two.

16. The combination with a photographic camera, comprising a lens support, an image support and an object support, and ways adapted to guide two of said supports with relation to the third, of a pintle or pintle bearing mounted on each one of the said supports and extending in a direction perpendicular to the direction of motion in the said ways, and means for adjusting two of said pintles or pintle bearings or their respective frames in the direction parallel with the said ways.

In testimony whereof I have signed this specification in the presence of two subscribing witnesses.

JOSEPH BECKER.

Witnesses:
MARY E. COWELL,
BENNETT S. JONES.

Corrections in Letters Patent No. 1,103,342.

It is hereby certified that in Letters Patent No. 1,103,342, granted July 14, 1914, upon the application of Joseph Becker, of Washington, D. C., for an improvement in "Photographic Cameras," errors appear in the printed specification requiring correction as follows: Page 3, line 18, after the word "camera," insert the following: *Equation (4) is referred to by French authors on optics as "Newton's formula," a practice that it will be convenient to follow in this specification, and that has its justification, as will be seen on referring to page 8, case 4, and Fig. 7 of Newton's "Opticks" (sic), London, 1704.*

*The co-varying constant product distances $PF$, $F'P'$ may accordingly be designated as the Newtonian space elements of the lens; while corresponding distances in the mechanism, such as $AD$ and $DA'$, Fig. 1, which must, respectively, remain equal to $PF$ and $F'P'$ by equations 2 and 3, may be designated as the Newtonian space elements of the mechanism.* same page, line 56, change "$D'A|$" to $D'A'$; same page, line 68, change $+$ to $\div$; same page, line 71, change $+$ to $\div$; page 4, line 66, for the word "form" read *from;* page 6, line 33, after the word "zero" insert the word *in;* and that the said Letters Patent should be read with these corrections therein that the same may conform to the record of the case in the Patent Office.

Signed and sealed this 4th day of August, A. D., 1914.

[SEAL.]

J. T. NEWTON,
*Acting Commissioner of Patents.*

It is hereby certified that in Letters Patent No. 1,103,342, granted July 14, 1914, upon the application of Joseph Becker, of Washington, District of Columbia, for an improvement in "Photographic Cameras," errors appear in the printed specification as follows: Page 8, line 3, for the word "of" read *or;* same page and line for the word "or" read *of;* also in the correction slip dated August 4, 1914, line 10, underscore the words "Newtonian space elements of the lens"; lines 12 and 13, underscore the words "Newtonian space elements of the mechanism"; and that the said Letters Patent should be read with these corrections therein that the same may conform to the record of the case in the Patent Office.

Signed and sealed this 29th day of September, A. D., 1914.

[SEAL.]

R. F. WHITEHEAD,
*Acting Commissioner of Patents.*